US011161620B2

(12) United States Patent
Porte et al.

(10) Patent No.: US 11,161,620 B2
(45) Date of Patent: Nov. 2, 2021

(54) AIRCRAFT NACELLE WITH ROTARY FAN COWLING INCORPORATING AN ACCESS HATCH

(71) Applicant: Airbus Operations SAS, Toulouse (FR)

(72) Inventors: Alain Porte, Colomiers (FR); François Pons, Daux (FR); Gregory Albet, Grepiac (FR)

(73) Assignee: Airbus Operations SAS, Toulouse (FR)

( * ) Notice: Subject to any disclaimer, the term of this patent is extended or adjusted under 35 U.S.C. 154(b) by 310 days.

(21) Appl. No.: 16/364,888

(22) Filed: Mar. 26, 2019

(65) Prior Publication Data

US 2019/0300191 A1  Oct. 3, 2019

(30) Foreign Application Priority Data

Mar. 29, 2018 (FR) ....................................... 1852742

(51) Int. Cl.
*B64D 29/06* (2006.01)
*B64D 29/08* (2006.01)
*B64C 7/02* (2006.01)

(52) U.S. Cl.
CPC ................ *B64D 29/06* (2013.01); *B64C 7/02* (2013.01); *B64D 29/08* (2013.01)

(58) Field of Classification Search
CPC ........ B64D 29/06; B64D 29/08; B64D 29/00; B64C 7/02; B64C 7/00
USPC ......................................................... 244/54
See application file for complete search history.

(56) References Cited

U.S. PATENT DOCUMENTS

| 5,350,136 A * | 9/1994 | Prosser .................. B64D 29/08 244/118.2 |
| 5,678,787 A * | 10/1997 | Kahn ........................ B64C 1/14 244/1 R |
| 7,789,347 B2 * | 9/2010 | Oberle ................ E05D 15/1005 244/129.4 |
| 9,783,314 B2 * | 10/2017 | Pautis ....................... F02K 1/18 |

(Continued)

FOREIGN PATENT DOCUMENTS

| FR | 2890378 A1 | 3/2007 |
| FR | 3036382 A1 | 11/2016 |

(Continued)

OTHER PUBLICATIONS

French Search Report; priority document.

*Primary Examiner* — Brady W Frazier
(74) *Attorney, Agent, or Firm* — Greer, Burns & Crain, Ltd.

(57) ABSTRACT

An aircraft nacelle comprising an air inlet, with a single fan cowling made of a single piece which extends over all the circumference of the fan. The fan cowling is borne by the air inlet and is mounted to be rotationally mobile about the axis of the nacelle relative to the air inlet, via a link and guiding arrangement comprising a circular rail and a runner capable of sliding along the circular rail. The fan cowling comprises one or more openings closed by hatches allowing access to the interior of the nacelle. The fan cowling has little susceptibility to being deformed both in flight and on the ground during maintenance operations. Furthermore, no pylon portion is needed in the zone of the fan cowling since the latter is not attached to the pylon.

12 Claims, 3 Drawing Sheets

(56) References Cited

U.S. PATENT DOCUMENTS

| | | | |
|---|---|---|---|
| 9,783,315 B2 | 10/2017 | James | |
| 10,752,371 B2* | 8/2020 | Cheung | B64D 29/04 |
| 2008/0277529 A1 | 11/2008 | Marche | |
| 2009/0272842 A1* | 11/2009 | Bulin | B64D 29/06 |
| | | | 244/54 |
| 2010/0140406 A1 | 6/2010 | Walton et al. | |
| 2011/0091317 A1* | 4/2011 | Regard | B64D 29/08 |
| | | | 415/201 |
| 2014/0334922 A1* | 11/2014 | Fabre | B64D 29/08 |
| | | | 415/201 |
| 2016/0032779 A1 | 2/2016 | Sawyers-Abbott | |
| 2016/0340024 A1 | 11/2016 | Pautis et al. | |
| 2018/0283216 A1 | 10/2018 | Ancuta et al. | |

FOREIGN PATENT DOCUMENTS

| | | |
|---|---|---|
| WO | 2014197057 A2 | 12/2014 |
| WO | 2017098122 A1 | 6/2017 |

\* cited by examiner

AIRCRAFT NACELLE WITH ROTARY FAN COWLING INCORPORATING AN ACCESS HATCH

CROSS-REFERENCES TO RELATED APPLICATIONS

This application claims the benefit of the France patent application No. 1852742 filed on Mar. 29, 2018, the entire disclosures of which are incorporated herein by way of reference.

FIELD OF THE INVENTION

The invention relates to an aircraft nacelle.

BACKGROUND OF THE INVENTION

An aircraft nacelle is a fairing which surrounds an engine in an aircraft; it is attached to an engine pylon, and its main functions are to support and protect the engine. Conventionally, a nacelle comprises, from front to rear, a first section upstream of the aerodynamic flow, called an air inlet, a second section which covers the casing of the engine fan, called a fan cowling, and a third section which generally has a thrust-reversing zone which surrounds the turbine body of the engine downstream of the aerodynamic flow.

The fan cowling fulfils several functions, including a function of protection of the engine and a function of continuity of the aerodynamic forms; another aim is to facilitate maintenance by offering access to the fan casing and to the systems attached thereto.

The known fan cowlings are composed of two semicircular half-cowlings 101, 102 arranged on either side of the pylon 104, as illustrated in FIG. 1. Each half-cowling 101, 102 is articulated on the pylon about an axis parallel to the central longitudinal axis of the nacelle, via a hinge arranged in the top part of the cowling and attached to the pylon 104. Each half-cowling is thus mobile between a closed position when the airplane is in operation and an open position in which an operator can access the engine. The two fan half-cowlings are held in the closed position by a locking system situated on the underside of the nacelle, that is to say, diametrically opposite the hinges linking the half-cowlings to the engine pylon. In the closed position, the upstream peripheral edge of each half-cowling rests on the air inlet. When closed, each half-cowling is positioned on the air inlet by virtue of a system of lugs provided on the inner face of the half-cowling, associated with holes formed on the air inlet. There is, therefore, no fixing between the air inlet and the half-cowling, only a positioning system.

This system for mounting the fan cowling on the engine pylon is qualified as a butterfly opening mounting. It presents various drawbacks illustrated in FIG. 2.

By virtue of its large dimensions, the fan cowling exhibits great flexibility.

In flight, that is to say, when the fan cowling is in closed position as illustrated in the left-hand part of FIG. 2, since it is fixed only at two diametrically opposite points, the cowling (101, 102) has a tendency to be deformed as indicated by the dotted line 105 (in the left-hand part of the figure) because of the pressure differences that exist inside and outside the nacelle and the conjugate actions of the deformations of the engine and of the deformations due to the extreme aerodynamic stresses. When the fan cowling is deformed in flight, a scooping phenomenon is created which further accentuates the deformation.

On the ground, during maintenance operations, that is to say, when the fan cowling is in open position as illustrated in the righthand part of FIG. 2, the latter exhibits a significant wind resistance which, given the flexibility of the cowling, can induce the deformations indicated by the dotted lines 106 (in the right-hand part of the figure). Furthermore, this wind resistance limits the maintenance operations to light wind conditions (wind speed below a certain value).

These problems are, in addition, aggravated by the current trend to increase the diameters of the nacelle. Being larger, the fan cowlings are even more flexible and exhibit an even greater wind resistance.

Another consequence of the increase in the diameter of the nacelles is to reduce the space available between the nacelle and the ground and therefore to render the access to the fan cowling closure systems more difficult for the operator.

Finally, an additional difficulty arises in the case of certain types of recent engines or engines in development, particularly in the case of the engines of UHBR (Ultra High Bypass Ratio) type. For an engine of UHBR type, the diameter of the nacelle is greater than for a conventional engine and its length is shorter. Now, the length of the air inlet has to remain substantially the same to ensure its functions, which results in a reduction in the length of the fan cowling. This length reduction is incompatible with the known, butterfly opening mounting systems. Considering another system for mounting the fan cowling is therefore an imperative need for these engines.

FR 3 036 382 discloses a nacelle whose fan is protected by a cowling in three independent portions, namely two top cowling portions with a butterfly opening, rotationally articulated about hinges attached to the pylon in the top part of the nacelle, and a third, bottom cowling portion mounted to slide on semicircular rails. In the closed position, the third cowling portion is situated in the bottom part of the nacelle and it extends between the free edges of the two top cowling portions. The reduction of the size of the butterfly opening cowling portions in the nacelle of FR 3 036 382, compared to the nacelles equipped only with two butterfly opening half-cowlings (that is to say, with no third, bottom cowling portion), makes it possible to limit the amplitude of the deformation of the butterfly opening cowling portions but does not completely resolve this problem.

SUMMARY OF THE INVENTION

The invention aims to overcome the abovementioned drawbacks by providing a nacelle whose fan cowling has little susceptibility to being deformed both in flight and on the ground during maintenance operations. An objective of the invention is also to provide a new nacelle suited to the engines of UHBR type.

To do this, the invention proposes an aircraft nacelle comprising an air inlet and a fan cowling, wherein the nacelle:

comprises a single fan cowling made of a single piece which extends over all the circumference of the fan, unlike the nacelle of FR 3 036 382 for which it can be stated either that it comprises not one but three cowlings which, in addition, each extend only over a part of the circumference of the fan, or that it comprises one cowling which completely surrounds the fan (when the cowling portions are in closed position) but which is not made of a single piece since it is split up into three independent portions, the fan cowling is mounted and articulated on the air inlet via link and guiding means comprising a circular rail whose axis is the central axis of the nacelle and a runner capable of sliding along the circular rail, such that the fan cowling is attached to the air inlet and is rotationally mobile about the axis of the nacelle relative to the air inlet, the fan cowling comprises one or more access openings closed by hatches allowing access to the interior of the nacelle. The rotation of the fan cowling about the axis of the nacelle makes it possible to position the hatch (or one of the hatches) facing the zone of the engine to which access is required.

It should be noted that, in a nacelle according to the invention, the circular rail extends over all the circumference of the fan (contrary to the rail of FR 3 036 382 on which the bottom cowling portion slides) and is of constant diameter.

Depending on the form of the runner, the fan cowling is attached to the air inlet over all the length of the circular rail and therefore over all the periphery of the cowling or it is so attached only at a given number of points, for which the number and the location at the periphery of the cowling can advantageously be chosen so as to limit the deformations undergone by the cowling and the risks of scooping. The deformations that the earlier fan cowlings undergo in flight and the risks of scooping in flight are even eliminated if the runner extends over all the periphery of the fan cowling, that is to say, over all the length of the circular rail.

During the maintenance operations, the fan cowling remains in place, held over all its periphery or at a certain number of points distributed at its periphery, and only an access hatch to the engine is open or removed. Thus, the cowling does not undergo any deformation during maintenance operations, unlike the earlier butterfly opening cowlings as explained in relation to FIG. 1 (right-hand part).

Furthermore, since the fan cowling is borne by the air inlet and has no articulation at the level of the axis of the pylon, the pylon portion extending into the zone of the fan cowling becomes pointless and can be eliminated. That said, the fan cowling can receive an aerodynamic boss in continuity with the front aerodynamic form of the pylon. This boss is pointless if the pylon is embedded in the line of the nacelle.

Preferably, the fan cowling is rotationally mobile relative to the air inlet over 360°, in which case only one hatch is necessary to be able to access all the zones of the fan casing, which does not preclude the possibility of providing several thereof. If the rotation of the fan cowling about the axis of the nacelle is limited to an angle less than 360°, several hatches should be provided (two hatches are sufficient in the case of rotation of at least 180°) to be able to comfortably access any zone of the fan casing.

It should be noted that the fan cowling according to the invention can cover, externally, between 20 and 100% of the fan casing of the engine.

Regarding the link means between the air inlet and the fan cowling, the circular rail can be fixed to the air inlet, the runner then being fixed to the fan cowling. As a variant, conversely, the circular rail is fixed to the fan cowling and the runner is fixed to the air inlet.

According to an advantageous feature of the invention, the runner is formed by a plurality of localized members, distributed (preferably regularly) about the central longitudinal axis of the nacelle.

In a first version of the invention:
the circular rail comprises
a support portion by which the circular rail is fixed to one of the two elements out of the air inlet and the fan cowling, a guiding portion having the form of a rib. The guiding rib is advantageously toroidal (that is to say, that it has a circular cross section) but other sections are possible, whereas the runner is formed by a plurality of members each comprising a foot by which the member is fixed to the other of the two elements (fan cowling or air inlet), and a stirrup or carriage in which the guiding rib of the circular rail is fitted, the stirrup (or carriage) having a section complementing that of the guiding rib. Thus, for example, if the guiding rib is of toroidal form, the stirrup has a C-shaped cross section; if the guiding rib has a parallelepipedal cross section, the stirrup has a U-shaped cross section.

As a variant, in a second version of the invention:
the circular rail comprises
a support portion by which the circular rail is fixed to one of the two elements out of the air inlet and the fan cowling, and a guiding portion having the form of a trough having a C-shaped section, whereas the runner is formed by a plurality of members each comprising a foot by which the member is fixed to the other of the two elements (fan cowling or air inlet)

and a ball joint fitted into the C-shaped trough of the circular rail.

These ball joints can be produced in a fiber-based composite material, in particular, a carbon-based composite material whose self-lubricating nature is advantageous.

The invention is not limited to the forms previously defined for the circular rail and the runner. In particular, the runner can extend over all the length of the circular rail instead of being composed of localized members. While it does make it possible to guarantee a minimal risk of deformation of the fan cowling in flight, this variant does, however, have a mass greater than the two versions previously defined, which is never desirable for aircraft equipment.

The hatch allowing access to the engines, or at least one of the hatches, even each hatch (if the fan cowling has several thereof), is mounted to swing on the fan cowling via a hinge whose axis can be parallel or orthogonal to the longitudinal axis of the nacelle.

As a variant, the hatch, or at least one of the hatches (if the fan cowling has several thereof), is mounted to slide on the fan cowling, for example along an axis parallel to the axis of the nacelle or in a circular direction normal to the axis of the nacelle, by any appropriate means.

As a variant, the hatch or at least one of the hatches (if the fan cowling has several thereof) is removably mounted on the fan cowling, so as to be entirely removed when wanting access to the engine.

According to a possible feature of the invention, the nacelle comprises means for locking the rotation of the fan cowling.

According to a possible feature, these locking means are provided at the hatch which allows access to the engine, or at one of the hatches, even each hatch (if the cowling has several thereof). For example, at least a part of the locking means is incorporated in the hatch, in one of the hatches, even in each hatch (if the cowling has several thereof).

For example, to ensure the fixing of the hatch on the air inlet (and therefore the locking of the fan cowling relative to the air inlet), the hatch has a portion extending upstream protruding from the fan cowling so as to cover a zone of a downstream edge of the air inlet and the protruding portion of the hatch is provided with an attachment, configured to cooperate with a complementary attachment fixed to a frame of the air inlet.

The invention extends to an aircraft nacelle characterized in combination by all or part of the features mentioned hereinabove and hereinbelow. In other words, all the possible combinations from the features described in the present application conform to the invention provided that there is no incompatibility between the combined features.

BRIEF DESCRIPTION OF THE DRAWINGS

Other details and advantages of the present invention will become apparent on reading the following description, which refers to the attached schematic drawings and relates to preferential embodiments, provided as nonlimiting examples. In these drawings.

DETAILED DESCRIPTION OF THE PREFERRED EMBODIMENTS

Figure 1:
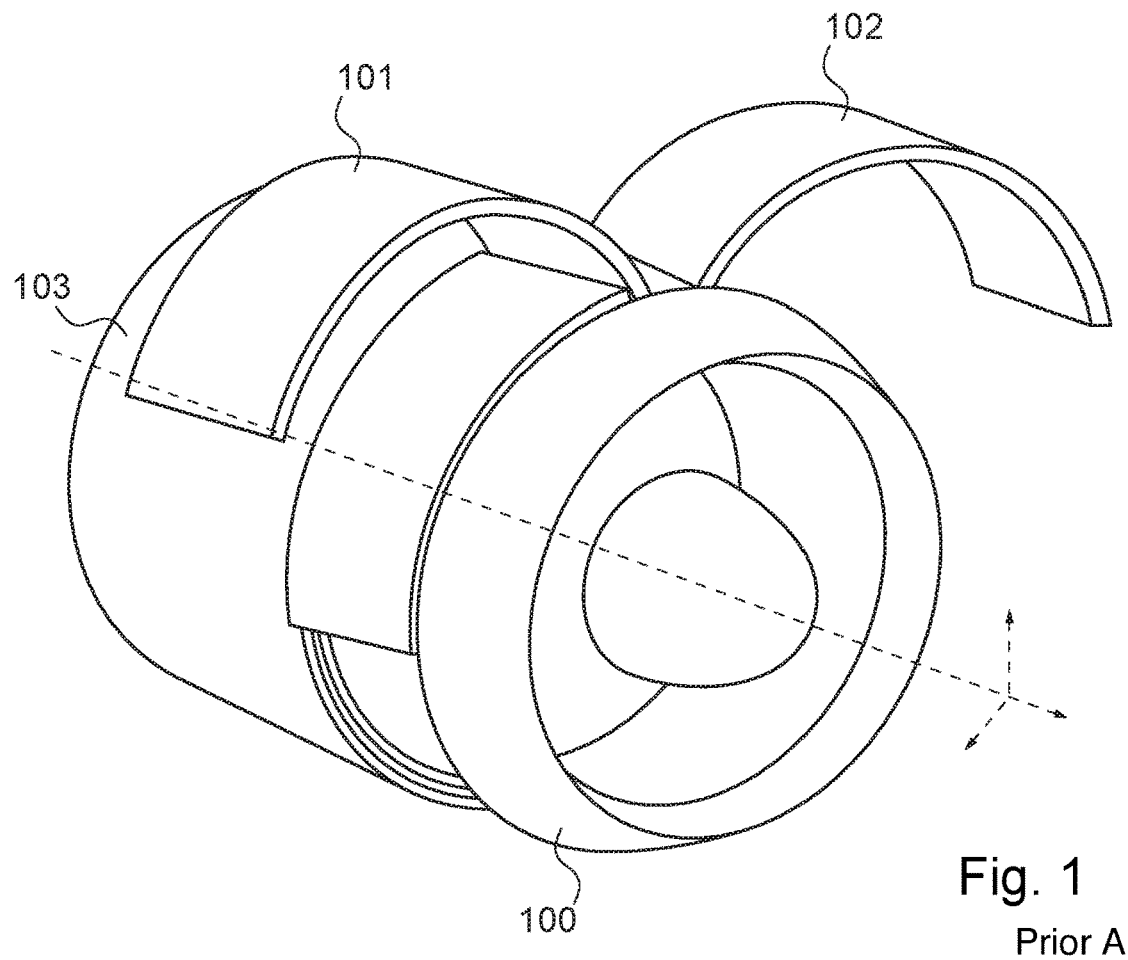
FIG. 1 is a perspective view of an earlier butterfly opening nacelle.
Figure 2:
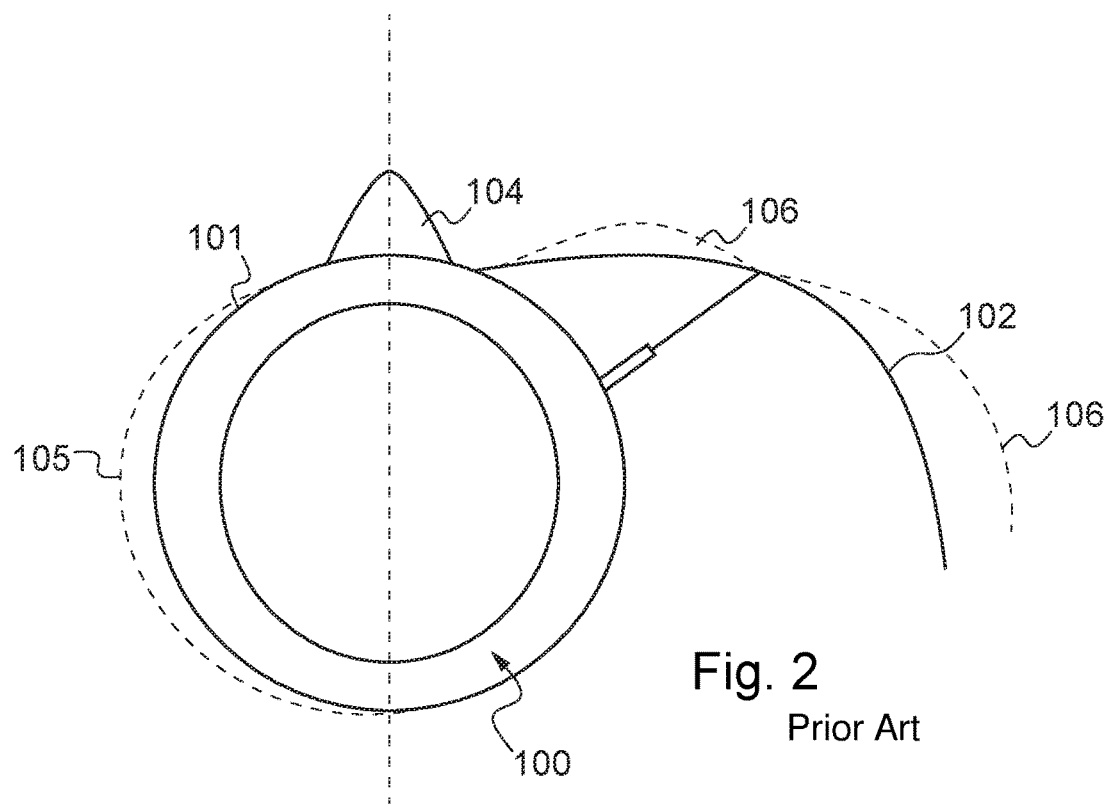
FIG. 2 is a schematic front view of the earlier butterfly opening nacelle of FIG. 1.

FIGS. 1 and 2 relate to nacelles having a butterfly opening fan cowling according to the prior art. They have been described in the Background section. FIG. 2 illustrates, in particular, the deformations that the earlier fan cowlings undergo in flight when the fan cowling is closed (left-hand part of the figure) and on the ground when the fan cowling is open (right-hand part of the figure).

Figure 3:
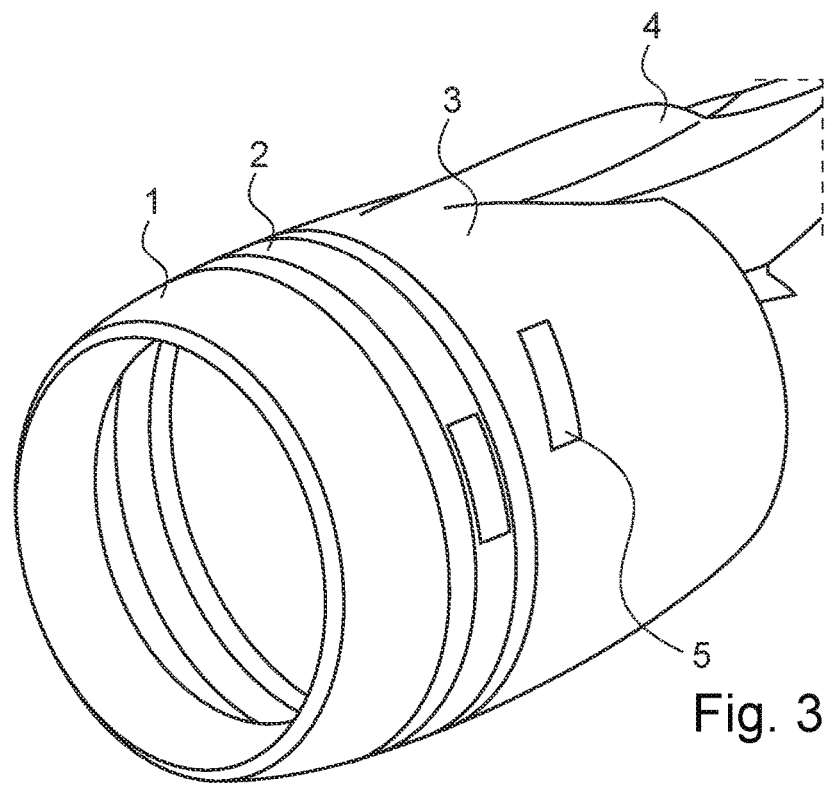
FIG. 3 is an exploded perspective view of a nacelle according to the invention with rotary fan cowling.
Figure 4:
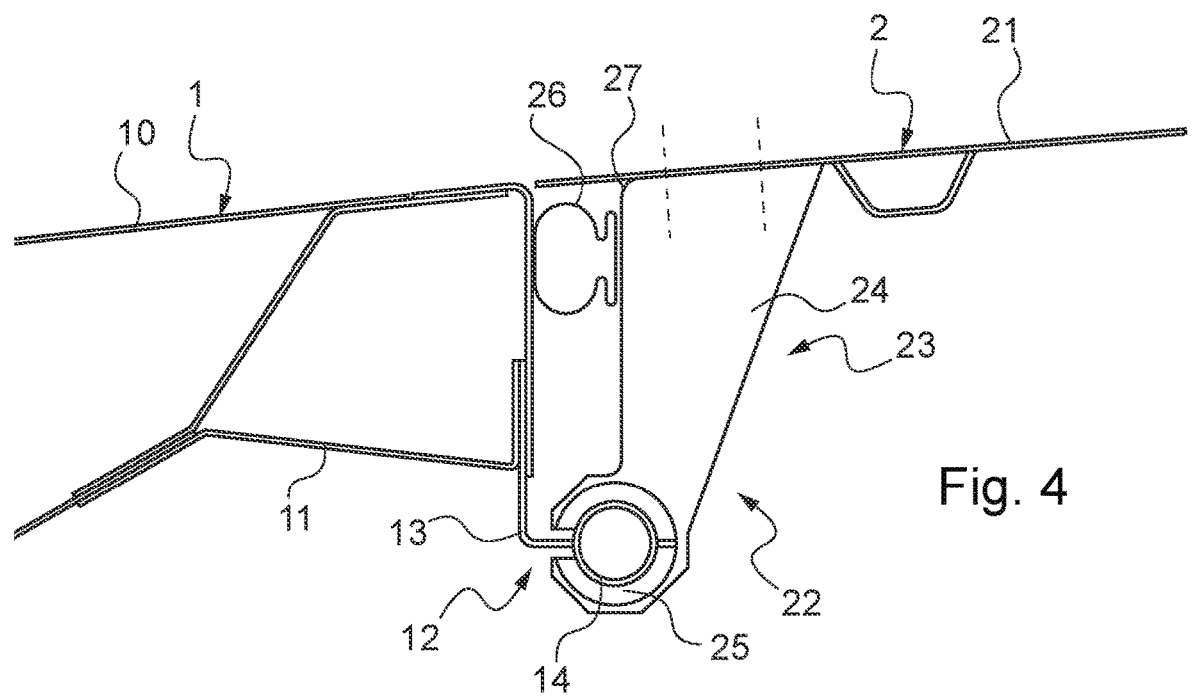
FIG. 4 is a longitudinal cross-sectional view of a portion of a nacelle according to the invention at the join between the air inlet and the fan cowling.

The nacelle according to the invention, illustrated in FIGS. 3 and 4, comprises an air inlet 1, a fan cowling 2, and a downstream portion 3 having a thrust reversing zone. The assembly is borne by a pylon 4. Normally (see FIG. 4), the air inlet 1 comprises, among other things, an outer wall 10 and a frame 11, and the fan cowling comprises an outer wall 21 in the extension of the outer wall 10 of the air inlet.

According to the invention, the fan cowling 2 is mounted to rotate about the central axis of the nacelle relative to the air inlet 1 (and to the downstream portion 3). To this end, a guiding rail 12 is provided on the downstream edge of the air inlet 1, and a runner 22 is provided on the upstream edge of the fan cowling 2.

In the example illustrated, the guiding rail 12 comprises a support portion 13 rigidly fixed to the frame 11 of the air inlet, and a toroidal guiding rib 14. The runner 22 is formed by a plurality of localized members 23 each comprising, on the one hand, a foot 24 rigidly fixed to a frame 27 and to the outer wall 21 of the fan cowling, and, on the other hand, a stirrup 25 having a C-shaped section. The toroidal guiding rib 14 of the circular rail is fitted into the stirrup 25 of each member 23 of the runner.

The link between the circular rail 12 and the runner 22 is therefore, here, discontinuous. In order to ensure a good distribution of the weight of the fan cowling on the air inlet, several members 23 are provided, regularly distributed about the central axis of the nacelle. The greater the number of localized members 23, the more the "isostatic" aspect is improved and the less the fan cowling is deformed under load between two successive members. Furthermore, a greater number of members for the runner makes it possible to facilitate the sliding of the members on the rail and therefore the rotation of the fan cowling relative to the air inlet. As a counterpart, the mass of the aircraft is increased. A trade-off must therefore be found between the limiting of the deformation and the increasing of the mass. The number of members 23 preferably lies between four and ten, and it can depend on the diameter of the fan cowling. The runner comprises, for example, eight members 23 separated from one another by angles of 45°.

As a variant, the link between the circular rail and the runner could be continuous over all of the circular rail.

According to the invention, the fan cowling 2 also comprises at least one hatch 5 allowing access to the interior of the nacelle and therefore to the engine and to the systems present on the fan casing. This hatch 5 is visible in FIG. 3. Here, it is a fully removable hatch; it is represented detached from the fan cowling 2.

In the example illustrated, the rotation of the fan cowling relative to the air inlet is not limited, that is to say, that it can be performed over 360°, in order for the opening left by the hatch 5 when the latter is removed, to be able to be positioned facing any zone of the fan casing.

Preferably, the nacelle also comprises a seal 26 between the fan cowling 2 and the air inlet 1, which seal is fixed either to the fan cowling, as illustrated in FIG. 4, or to the air inlet (variant not represented). This seal 26 makes it possible to limit the aerodynamic disturbances at the joint between the air inlet 1 and the fan cowling 2. It is positioned as close as possible to the outer walls 10 of the air inlet and 21 of the fan cowling in order to minimize the disturbances. It should be noted that the aerodynamic disturbances are already reduced in the absence of a seal by virtue of the invention, because of the fact that the link between the air inlet and the fan cowling makes it possible to offer a tight tolerance between these two elements.

Figure 5:
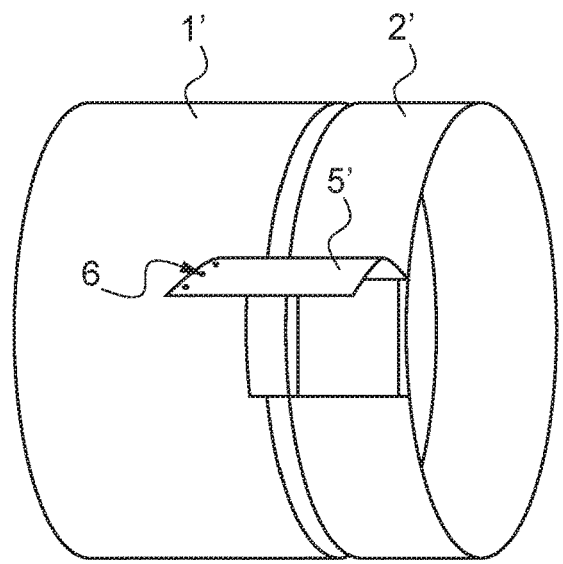
FIG. 5 is a three-quarter perspective view of a nacelle according to the invention provided with a hatch mounted to swing about an axis parallel to the longitudinal axis of the nacelle.
Figure 6:
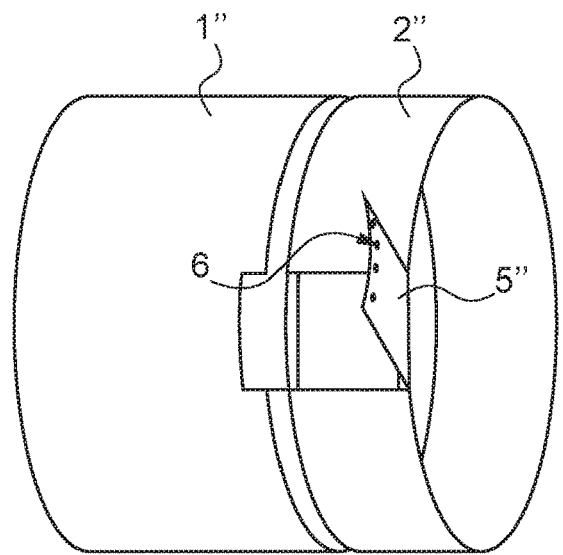
FIG. 6 is a three-quarter perspective view of a nacelle according to the invention provided with a hatch mounted to swing about an axis orthogonal to the longitudinal axis of the nacelle.
Figure 7:
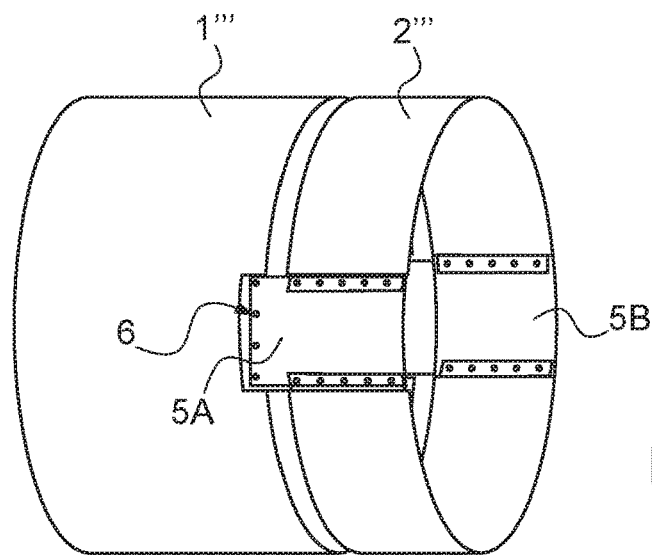
FIG. 7 is a three-quarter perspective view of a nacelle according to the invention provided with two hatches incorporating means for locking the rotation of the fan cowling.

Preferably, the nacelle further comprises means for locking the rotation of the fan cowling relative to the air inlet. These locking means can be incorporated in the hatch which allows access to the interior of the nacelle. For example, as illustrated in FIGS. 5 to 7, the hatch (or at least one of the hatches if the fan cowling has several thereof) extends protruding from the upstream edge of the fan cowling so as to cover a zone of the downstream edge of the air inlet. It is then possible to provide reversible attachment means 6 (screw or the like) along the upstream edge of the hatch, capable of cooperating with complementary reversible attachment means (tapped bores or the like) provided on the zone of the downstream edge of the air inlet that the hatch covers in closed position. The protruding upstream edge of the hatch and the reversible attachment means 6 form the abovementioned rotation locking means.

The hatch can be completely removable like the hatch 5 illustrated in FIG. 3 or the hatches 5A and 5B illustrated in FIG. 7. As a variant, the hatch is mounted to swing (pivot) about a longitudinal axis like the hatch 5' illustrated in FIG.

5 or it is mounted to swing (pivot) about an axis lying in a transverse plane like the hatch 5" illustrated in FIG. 4.

The invention extends to any variant accessible to the person skilled in the art, that is to say falling within the scope delimited by the attached claims.

By way of examples: the circular rail can be fixed to the fan cowling and the runner fixed to the air inlet; the circular rail can have a guiding portion in the form of a C-shaped trough, and the runner members can have ball joints fitted into the guiding trough.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nacelle comprising
   an air inlet,
   a single fan cowling made of a single piece which extends over an entire circumference of a fan,
      the fan cowling being mounted and articulated on the air inlet via link and guiding means comprising a circular rail centered on a central longitudinal axis of the nacelle and a runner configured to slide along the circular rail, such that the fan cowling is rotationally mobile about the axis of the nacelle relative to the air inlet;
      the fan cowling comprising one or more access openings closed by a respective one or more hatches allowing access to the interior of the nacelle.

2. The aircraft nacelle as claimed in claim 1, wherein the circular rail extends over the entire circumference of the fan.

3. The nacelle as claimed in claim 1, wherein the fan cowling is rotationally mobile relative to the air inlet over 360°.

4. The aircraft nacelle as claimed in claim 1, wherein the circular rail is fixed to the air inlet and the runner is fixed to the fan cowling.

5. The aircraft nacelle as claimed in claim 1, wherein the runner is formed by a plurality of localized members distributed about the central longitudinal axis of the nacelle.

6. The aircraft nacelle as claimed in claim 1, wherein the circular rail comprises
   a support portion by which the circular rail is fixed to the air inlet,
   a guiding portion in the form of a toroidal rib, and
   wherein the runner is formed by a plurality of members each comprising a foot by which the member is fixed to the fan cowling, and
   a stirrup in which the toroidal rib of the circular rail is fitted, the stirrup having a C-shaped section.

7. The aircraft nacelle as claimed in claim 1, further comprising means for locking a rotation of the fan cowling.

8. The aircraft nacelle as claimed in claim 7, wherein the locking means are provided at at least one of the hatches of the fan cowling.

9. The aircraft nacelle as claimed in claim 8, wherein said hatch has a protruding portion extending upstream protruding from the fan cowling so as to cover a zone of a downstream edge of the air inlet, wherein the protruding portion is provided with a reversible attachment, configured to cooperate with a complementary reversible attachment fixed to a frame of the air inlet.

10. A propulsion assembly for aircraft, comprising a nacelle as claimed in claim 1.

11. An aircraft comprising at least one propulsion assembly as claimed in claim 10.

12. The aircraft nacelle as claimed in claim 1, wherein the circular rail comprises
    a support portion by which the circular rail is fixed to the fan cowling,
    a guiding portion in the form of a toroidal rib, and
    wherein the runner is formed by a plurality of members each comprising a foot by which the member is fixed to the air inlet, and
a stirrup in which the toroidal rib of the circular rail is fitted, the stirrup having a C-shaped section.

* * * * *